May 4, 1926.
C. C. FARMER
1,582,918
BRAKE VALVE PEDESTAL
Filed May 27, 1925
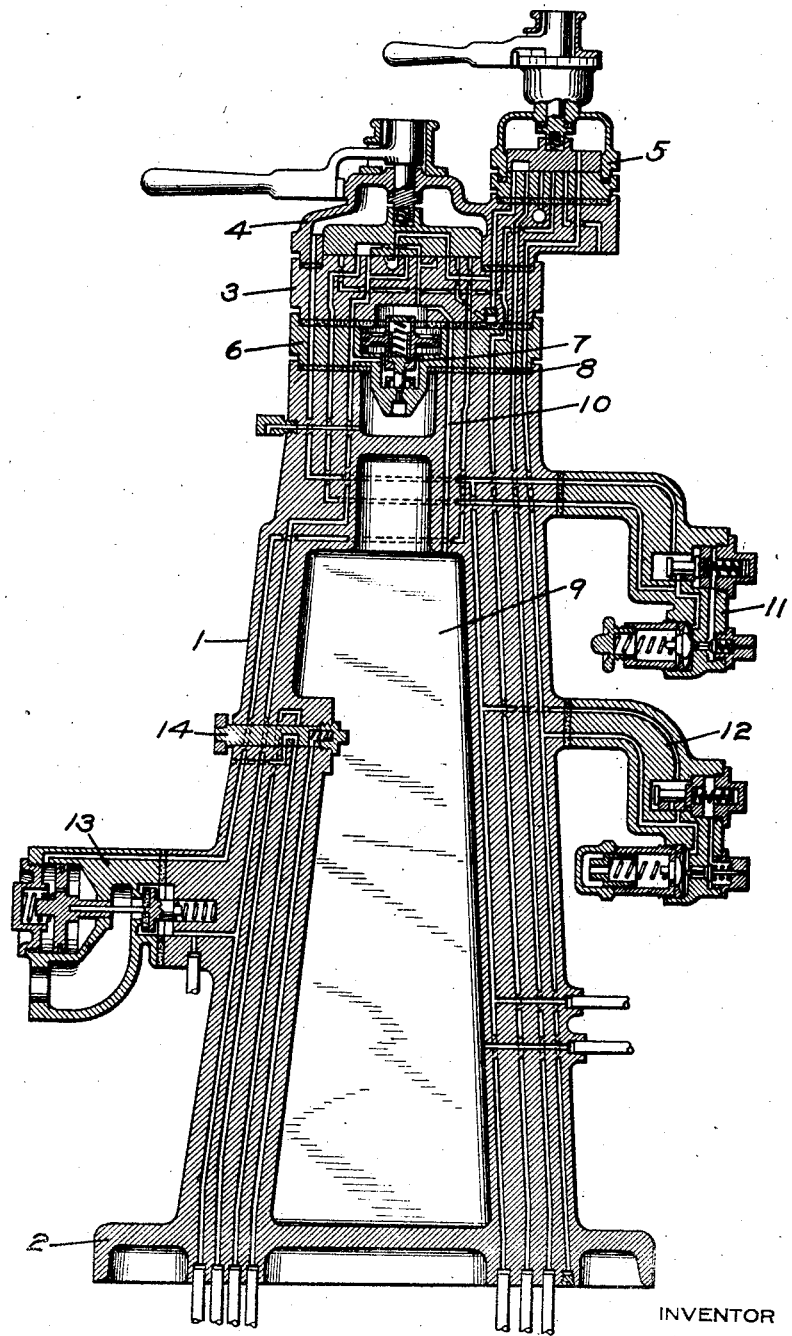
INVENTOR
CLYDE C. FARMER
BY *Wm. M. Cady*
ATTORNEY Patented May 4, 1926.

1,582,918

UNITED STATES PATENT OFFICE.

CLYDE C. FARMER, OF PITTSBURGH, PENNSYLVANIA, ASSIGNOR TO WESTINGHOUSE AIR BRAKE COMPANY, OF WILMERDING, PENNSYLVANIA, A CORPORATION OF PENNSYLVANIA.

BRAKE-VALVE PEDESTAL.

Application filed May 27, 1925. Serial No. 33,153.

*To all whom it may concern:*

Be it known that I, CLYDE C. FARMER, a citizen of the United States, residing at Pittsburgh, in the county of Allegheny and State of Pennsylvania, have invented new and useful Improvements in Brake-Valve Pedestals, of which the following is a specification.

This invention relates to fluid pressure brakes and has for its principal object to provide an improved combined pipe bracket and supporting means for the brake valves on the locomotive.

In the accompanying drawing, the single figure is a diagrammatic sectional view of an automatic and independent brake valve device mounted on a combined pipe bracket and support constructed in accordance with my invention.

According to my invention and as shown in the drawing, the combined pipe bracket and support is constructed in the form of a pedestal 1, the base of which has a flange extension 2, serving as a bolting flange by which the pedestal is secured to the locomotive cab floor.

The brake valve device may comprise a main casing section 3, a cover section 4, with which is associated the usual independent brake valve device 5, and a section 6, which contains the usual equalizing discharge valve mechanism 7.

The upper face of the pedestal support 1 is provided with a gasket face with which the gasket face of the section 6 is adapted to register, the usual gasket 8 being interposed between the gasket faces. The several sections of the brake valve device are secured to the pedestal by bolts (not shown).

The usual passages from the brake valve device register with corresponding passages, which extend downwardly through the walls of the pedestal 1 and are connected to the corresponding pipes at the floor of the cab.

Instead of employing the usual equalizing reservoir in connection with the equalizing discharge valve mechanism 7, I provide a central chamber 9 in the pedestal 1 and utilize said chamber as the equalizing reservoir, the chamber being connected to the equalizing discharge valve mechanism by a passage 10.

I also employ the pedestal as a support for such auxiliary valve devices as are usually associated with the brake valve device and for this purpose I provide raised portions at desired locations on the pedestal having gasket faces to which may be applied a desired valve device. In the drawing I have shown a feed valve device 11, a reducing valve device 12, and a vent valve device 13 applied as above indicated.

The usual cut-out cock 14 may also be incorporated in the body of the pedestal, a bore for the cock being provided in the pedestal at such location as to permit the desired control of the passages usually controlled by the cut-out cock.

By means of the above described construction, the pedestal support for the brake valve serves as a pipe bracket and as a support for auxiliary valve devices associated with the brake valve, as well as providing a chamber to take the place of the usual equalizing reservoir, thus providing a rigid support for the brake valve and since all pipe connections are made to the pedestal, the possibility of leakage at pipe joints is reduced to a minimum.

Having now described my invention, what I claim as new and desire to secure by Letters Patent, is:—

1. The combination with a brake valve device, of a pedestal mounted on the floor of the vehicle and on which said brake valve device is mounted and having passages connected to said brake valve device and pipes connected to said passages.

2. The combination with a brake valve device, of a pedestal mounted on the floor of the vehicle and on which said brake valve device is mounted and having passages therein leading from said brake valve device to the base of the pedestal, and pipes connected to said passages at the base of the pedestal.

3. The combination with a brake valve device, of a pedestal mounted on the floor of the vehicle and on which said brake valve device is mounted and having passages extending vertically through the walls of said pedestal and pipes connected to said passages, said pedestal being provided with one or more gasket faces for receiving the gasket face of an auxiliary valve device.

4. The combination with a brake valve device having an equalizing discharge valve mechanism, of a pedestal support for said brake valve device, said pedestal having a chamber therein serving as the equalizing reservoir for said equalizing discharge valve mechanism.

5. The combination with a brake valve device having an equalizing discharge valve mechanism, of a pedestal having a gasket face with which the gasket face of said brake valve device registers and having passages leading from said brake valve device to the base of the pedestal, said pedestal having a centrally disposed chamber connected by a passage to said equalizing discharge valve mechanism and serving as the equalizing reservoir.

In testimony whereof I have hereunto set my hand.

CLYDE C. FARMER.